United States Patent [19]
Brennan

[11] 4,371,359
[45] Feb. 1, 1983

[54] UNIVERSAL JOINT

[75] Inventor: Michael J. Brennan, Lake Orion, Mich.

[73] Assignee: Ex-Cell-O Corporation, Troy, Mich.

[21] Appl. No.: 216,396

[22] Filed: Dec. 15, 1980

[51] Int. Cl.³ .............................................. F16D 3/26
[52] U.S. Cl. ...................................... 464/136; 29/434
[58] Field of Search ............... 64/17 R; 464/136, 134; 29/434

[56] References Cited
U.S. PATENT DOCUMENTS

| 927,087 | 7/1909 | Vanderbeek | 64/17 R |
| 1,096,235 | 5/1914 | Fox | 64/17 R |
| 1,216,445 | 2/1917 | Harrington et al. | 64/17 R |
| 2,264,727 | 12/1941 | Stillwagon, Jr. | 64/17 R |
| 2,648,207 | 8/1953 | Quinn | 64/17 R |

Primary Examiner—Stanley N. Gilreath
Attorney, Agent, or Firm—Edward J. Timmer; Mitchell J. Hill; John C. Evans

[57] ABSTRACT

A universal joint comprising a block and pin type mount as component parts of honing tool assembly. Each pin is mounted and locked in place with set screws to the universal joint drive block.

3 Claims, 6 Drawing Figures

U.S. Patent  Feb. 1, 1983  4,371,359
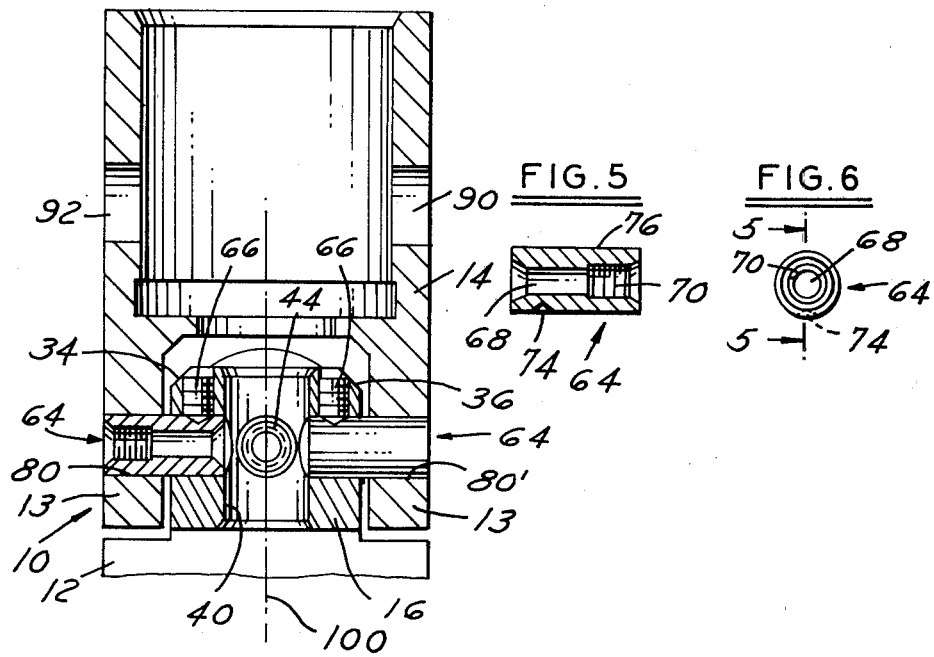
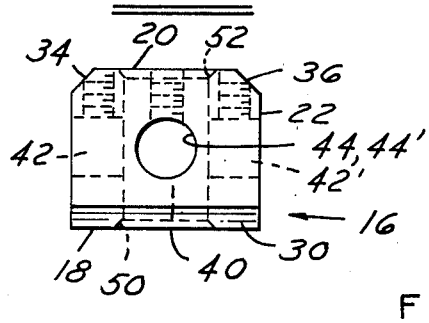
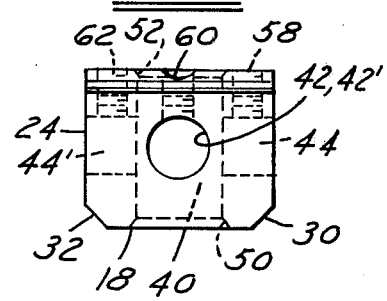
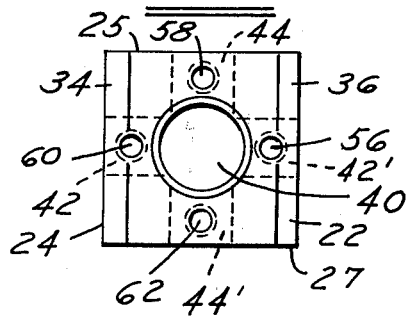

UNIVERSAL JOINT

BACKGROUND AND SUMMARY OF PRIOR ART

This invention relates to an improvement in universal joints. Block and pin type universal joints are well recognized in the art. For example, U.S. Pat. Nos. 1,096,235 issued May 12, 1914 to Fox and 1,108,567 issued Aug. 25, 1914 to Fox disclose a typical block and pin type universal joint with screw to secure the pin onto the shaft. However, the improved invention disclosed herein relates to a means for quickly disassembling the universal components as replacement parts. A set of four pins are mounted and locked in place with set screws to a universal joint drive block, as an assembly, joining the upper and lower halves of a honing tool assembly to form a honing tool universal joint.

A tapped hole through the center of each pin is provided to allow a bolt to be inserted. To disassemble, the lock screws are removed and the bolt is driven by a punch instead of the pin being driven. Consequently, the pin is easily removed without distortion from impact with a punch.

Since the pins slip in the ears of the tool body components and not in the drive block, and the wear surfaces of the component parts are farther from the rotational axis of the honing tool, the resulting mechanical advantage reduces the rate of wear.

BRIEF DESCRIPTION OF THE DRAWINGS

FIG. 1 is an assembly view, partly in cross section, of the universal joint embodying the invention.

FIG. 2 is a plan view of the universal joint block.

FIG. 3 is a plan view of the block viewed 90 degrees from FIG. 2.

FIG. 4 is a top plan view of the block.

FIG. 5 is a cross section view of the pin.

FIG. 6 is an end view of the pin.

DESCRIPTION OF THE INVENTION

A universal joint is adapted to be rotated in a conventional honing machine, disclosed in U.S. Pat. No. 2,787,867, issued Apr. 9, 1957 to Klein showing a typical universal joint between the drive shaft connector. Referring to FIG. 1, the universal joint 10 is mounted between the extensions or ears 13 of a tubular drive shaft connector 14 and the ears (not shown) of a honing tool body 12 with the drive block 16 interconnecting both above named components.

The drive block 16 is a unitary structure, preferably made of typical bar-stock metal material in the form of a cube. The block has six faces; a bottom face 18, a top face 20 and end faces 22, 24, 25 and 27. The bottom face 18 includes chamfers 30, 32, and the top face 20 includes chamfers 34 and 36. The chamfers 30, 32 and 34, 36 on the bottom and top faces respectively of the block 16 provide for any angular misalignment between the tubular drive shaft connector 14 and honing tool body 12.

Three holes are bored at right angles to each each other with their axes intersecting the centerlines of each hole. The axial bore 40, is slightly chamfered at 50 and 52 to break the rough edge of the metalic block. The purpose of the axial bore is to allow a cone rod to extend therethrough for expansion of abrasive stones in a honing tool.

Looking at FIG. 4, a top view of the block 16, four holes 56, 58, 60 and 62 are tapped through the top half extending to the bores 42, 42' and 44, 44'.

A pin 64, as shown in FIG. 5 and FIG. 6 is mounted in each bore 42, 42', 44, 44' and locked in place with a of set or lock screw 66. Each pin 64 has a bore 68 extending axially and longitudinally therethrough.

The bore 68 of pin 64 is tapped at one end 70 thereof to provide for insertion of a bolt therein for purposes to be herein described. A drill point 74 is drilled on the surface or outer diameter 76 of pin 64 for the purpose of holding each pin in position within the bore.

The set of four pins 64 are mounted in the bores 42, 42' and 44, 44' and locked in place with set screws 66 that extend through the tapped boxes 56, 58, 60 and 62 with the tip of the set screws abutting the drill point 74 on each pin 64. As a consequence thereof, each pin 64 is prevented from being withdrawn from the bores of the universal joint assembly, thereby joining both the honing tool body 12 with the connector shaft 14 as shown in FIG. 1.

To disassemble the universal joint assembly, pins are removed from the bores 90 and 92 of the drive shaft connector 14 holding the drive shaft connectors to a drive shaft (not shown). Moving the entire honing tool assembly and connector shaft 14 over to a work bench, the operator first removes the set screws 66. A threaded screw (not shown) is adopted to be threaded into the bore 68 of one pin 64. A punch having a diameter smaller than the bore 68 of the pin 64 is inserted from the opposite direction and tapped against the end of the threaded screw with a hammer until the pin 64 is moved outwardly. Further tapping should move the pin out of the bore 80 or 80' sufficiently to remove same. The threaded screw is then removed and inserted in the other pin 64 on the opposite side of the pin removed. The punch is again inserted from the opposite end of the bore to drive against the end of the screw and consequently not on the pin.

Thereafter, the pins 64 are removed in turn without distortion from impact with a punch or hammer. That is, the threaded screw that is threaded into the bore 68 of each pin is driven by a punch instead of the pin being driven and consequently the driving forces are absorbed by the threads and not on the pin itself. This prevents the pins from getting soft by repeating hitting of a hammer blow. Moreover, the pins slip or are loose fitting, in the bores of the block 16, and have a close tolerance, or tight fitting, in the bores of the drive shaft connector and the honing tool body. Since the tongue is close to the center rotational axis 100 of the assembly, the greater the distance from the center rotational axis, the lesser the forces. Consequently, wear surfaces of the mating parts are farther from the rotational axis 100 of the boring tool and connector shaft and the resultant mechanical advantage reduces the rate of wear.

While the best mode for practicing the invention has been described in detail, and other modes have been described gererally in detail, those familiar with the art will recognize various alternative designs and embodiments for practicing the invention as defined by the claims.

What is claimed is:

1. In a universal joint, the combination of opposite bifurcated joint members, each of said bifurcated joint members having a bore therethrough, a joint block having a plurality of extended bores in the sides of said block 90 degrees from each adjacent extended bore and intersecting the centerlines of each adjacent extended bore, a plurality of bores threaded from the top surface portion of said block to said extended bores, a pin mounted in each of said bores extending through said bores of said bifurcated joint members and through said extended bores of said block and a set screw threaded into each of said top bores to maintain a locking relationship with each of said pins mounted in each extended bore, each said pin having a longitudinal bore therethrough with a threaded portion to threadably receive a screw for joint disassembly by punching the screw instead of the pin with the associated set screw unlocked.

2. The universal joint, as defined in claim 1 wherein each of said pins includes a drill point on the outer diameter thereon.

3. The universal joint, as defined in claim 1, with the joint block having a top, bottom and four sides thereon and an extended bore in each side of said block.

* * * * *